Patented July 14, 1936

2,047,435

UNITED STATES PATENT OFFICE 2,047,435

DINITROINDAZOL-DYESTUFFS FOR WOOL AND A PROCESS OF MAKING SAME

Emil Senn, Basel, Switzerland, assignor to J. R. Geigy S. A., Basel, Switzerland, a Swiss firm No Drawing. Original application July 22, 1931, Serial No. 552,556. Divided and this application February 14, 1934, Serial No. 711,281. In Germany July 28, 1930

5 Claims. (Cl. 260—45)

This application is divisional of application Ser. No. 552,556 filed by the same applicant on July 22, 1931.

This invention relates to the manufacture of new valuable brown nitrodyestuffs by causing a 3:5-dinitro-2-halogen-benzoic acid or a substitution product thereof to react with a phenylhydrazine-carboxylic acid.

Generally speaking the invention consists in condensing aromatic dinitrobodies of the benzene series of the following constitution:

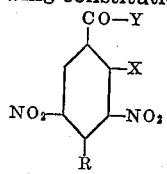

wherein X represents a halogen, Y represents OR, and R represents hydrogen or an alkyl group, in presence of an inert solvent, with an aryl-hydrazine-carboxylic acid.

The new dyestuffs dye animal fibres shades which are well levelled and are distinguished by a remarkable fastness to light. The condensation may be conducted in presence of water or of an organic solvent such as methyl or ethyl alcohol, glacial acetic acid, benzene, toluene or the like. It may be conducted with or without the addition of an acid binding agent, such as sodium acetate, potassium acetate, magnesia, etc.

The following example illustrates the invention, the parts being by weight:—

76 parts of phenylhydrazine-metacarboxylic acid, 123 parts of 3,5-dinitro-2-chlorobenzoic acid, 42 parts of anhydrous sodium acetate and 400 parts of glacial acetic acid are heated to boiling for 6–8 hours whilst stirring. After the reaction mixture has cooled, the product is separated by filtration and dissolved in 2,000 parts of hot water with the addition of sodium carbonate. The dyestuff is precipitated in the form of fine, small, black needles by salting out the deep brown solution. The product dyes wool in an acid bath pure yellowish-brown shades. It has the following formula:

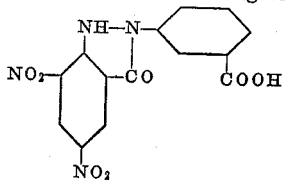

In this example, one may also start from any other aryl-hydrozinecarboxylic acid. The reaction can also be performed with esters of arylhydrazine-carboxylic acids, but the resulting products are in practice scarcely recommendable.

Instead of 3,5-dinitro-2-chlorobenzoic acid, there can also be used 3,5-dinitro-2-bromobenzoic acid, 3,5-dinitro-2-halogen-4-methylbenzoic acid, 3,5-dinitro-2-halogen-4-ethylbenzoic acid and so on; also their methyl- or ethylesters may be used.

What I claim is:—

1. A process for the manufacture of brown dinitro-iindazol-dyestuffs for wool, consisting in condensing by heating benzene dinitrobodies of the following constitution

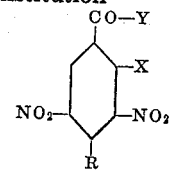

wherein X represents a halogen, Y represents OR, and R represents a member of the group consisting of hydrogen, a methyl and ethyl, in presence of an inert solvent, with an arylhydrazine-carboxylic acid of the benzene series.

2. A process for the manufacture of brown dinitro-indazol-dyestuffs for wool, consisting in condensing by heating benzene dinitrobodies of the following constitution

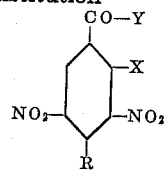

wherein X represents a halogen, Y represents OR, and R represents a member of the group consisting of hydrogen, methyl and ethyl, in presence of an inert solvent and with addition of an acid binding agent, with an arylhydrazine-carboxylic acid of the benzene series.

3. A process for the manufacture of brown dinitro-indazol-dyestuffs for wool, consisting in condensing by heating a phenyl-hydrazine-carboxylic acid in presence of an inert solvent with a 3,5-dinitro-2-halogen benzoic acid.

4. A process for the manufacture of brown dinitro-indazol-dyestuffs for wool, consisting in condensing by heating phenyl-hydrazine-metacarboxylic acid in presence of an inert solvent with a 3,5-dinitro-2-halogen benzoic acid.

5. Condensation products from halogen-dinitro-bodies of the benzene series and aryl-hydrazine-carboxylic acids of the benzene series, which constitute dyestuffs having the general formula

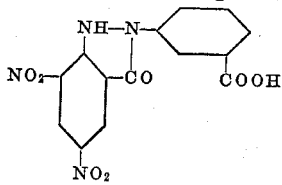

and dyeing wool in an acid bath brown shades well levelled and remarkably fast to light.

EMIL SENN.